United States Patent [19]

Inoue et al.

[11] Patent Number: 5,511,095
[45] Date of Patent: Apr. 23, 1996

[54] AUDIO SIGNAL CODING AND DECODING DEVICE

[75] Inventors: Takeo Inoue, Hirakata; Hideharu Nishida, Habikino; Shozo Sugishita, Hirakata; Akira Tsukihashi, Oizumi, all of Japan

[73] Assignee: Sanyo Electric Co., Ltd., Osaka, Japan

[21] Appl. No.: 45,426

[22] Filed: Apr. 13, 1993

[30] Foreign Application Priority Data

Apr. 15, 1992 [JP] Japan .................................. 4-095363
Sep. 9, 1992 [JP] Japan .................................. 4-240644

[51] Int. Cl.$^6$ ............................................. H04B 14/06
[52] U.S. Cl. ............................................. 375/244; 375/254
[58] Field of Search .................................. 381/30, 29, 31; 341/50, 51, 61, 76, 75; 360/40; 375/242, 254, 244, 245, 246, 247, 252, 240, 241

[56] References Cited

U.S. PATENT DOCUMENTS

| | | | |
|---|---|---|---|
| 4,368,487 | 1/1983 | Sabri | 375/27 |
| 4,518,950 | 5/1985 | Petr | 375/27 |
| 4,592,070 | 5/1986 | Chow et al. | 375/27 |
| 4,672,441 | 6/1987 | Hoelzlwimmer et al. | 375/27 |
| 5,230,060 | 7/1993 | Naitoh | 375/27 |

Primary Examiner—Stephen Chin
Assistant Examiner—Hai H. Phan
Attorney, Agent, or Firm—Armstrong, Westerman, Hattori, McLeland & Naughton

[57] ABSTRACT

The present invention relates to an audio signal coding and decoding device for coding and decoding an audio signal using an adaptive differential coding system. The audio signal coding and decoding device according to the present invention comprises an adaptive differential pulse code modulation coding device for coding an audio signal, an adaptive differential pulse code modulation decoding device for decoding the audio signal coded, an integrator provided in the preceding stage of the coding device and for decreasing the variation between unit samples of the input audio signal of the coding device, and a differentiator provided in the succeeding stage of the decoding device and for processing the audio signal decoded by the decoding device so that the variation decreased by the integrator is restored to the original one. Since the integrator is provided in the preceding stage of the coding device, the variation between the unit samples of the input audio signal of the coding device is decreased. Therefore, a prediction error signal obtained by the coding device is decreased. As a result, quantizer step-size is decreased, resulting in a reduced quantization error.

17 Claims, 6 Drawing Sheets

AUDIO SIGNAL CODING AND DECODING DEVICE

BACKGROUND OF THE INVENTION

1. Field of the Invention

The present invention relates to an audio signal coding and decoding device used for repairing the cutting of a sound in, for example, a potable compact disk player.

2. Description of the Prior Art

In a portable compact disk player (hereinafter referred to as a CD player), a sound may, in some cases, be cut off in an audio signal read from a compact disk (hereinafter referred to as a CD) due to flaws and dirt, and disturbances such as vibration. Therefore, the following device has been already developed as a device for preventing a sound from being cut off in the CD player. Specifically, digital audio signals recorded on the CD are read out at a speed in excess of an ordinary reading speed and are stored in a buffer memory, and the digital audio signals are outputted at the ordinary reading speed in the order stored in the buffer memory. When a sound is cut off in the audio signal read out from the CD due to the vibration or the like, writing to the buffer memory is interrupted, and a portion where the sound is cut off is detected to perform repair processing of the cutting of the sound. If time required to detect the portion where the sound is cut off and perform the repair processing of the cutting of the sound is within time corresponding to the capacity of the buffer memory, the continuity of the audio signals outputted from the buffer memory can be held.

If an attempt to directly write the audio signal read from the CD to the buffer memory is made, the buffer memory must have a large capacity. Generally in order to reduce the capacity of the buffer memory, therefore, the audio signal read from the CD is compressed by a coding device, a signal obtained by the compression is written to the buffer memory, and a signal outputted from the buffer memory is extended by a decoding device. A sound cutting preventing reproduction mode for compressing an audio signal to make reproduction while repairing the cutting of a sound is generally provided separately from a normal reproduction mode. Accordingly, in the sound cutting preventing reproduction mode, a certain degree of degradation of the sound quality is allowed.

Meanwhile, the audio signal recorded on the CD is 16-bit pulse code modulation (PCM) data sampled at a frequency of 44.1 kHz per channel (ch), and the transfer rate thereof is 705.6 kbps/ch. Examples of audio signal coding systems already suggested include an ATRAC (Adaptive Transform Acoustic Coding) system (transfer rate=about 140 kbps/ch) by SONY Corporation and a PASC (Precision Adaptive Subband Coding) system (transfer rate=192 kbps/ch) by Phillips Corporation. The systems are for obtaining a reproduced sound high in quality by dividing an audio signal into several bands and assigning the number of bits utilizing hearing characteristics to each of the bands to code the audio signal.

In addition to the above described systems, an ATC (Adaptive Transform Coding) system, an ADPCM (Adaptive Differential Pulse Code Modulation) system and the like have been generally known as audio signal coding systems. Particularly, the ADPCM system is the simplest coding system. In this system, it is found that when the amount of information of not less than a predetermined amount (5 bits) is assigned to a prediction error signal, a reproduced sound which is by no means inferior to the original sound is obtained if an ordinary music source is reproduced.

FIG. 1 shows a conventional coding device using an ADPCM system. A differential circuit 20 finds a difference $d_n$ (a prediction error signal) between a 16-bit digital audio signal $x_n$ and a predicted signal $y_n$. Specifically, the differential circuit 20 finds the prediction error signal $d_n$ on the basis of the following expression (1):

$$d_n = x_n - y_n \tag{1}$$

The prediction error signal $d_n$ is sent to an encoder 30. The encoder 30 codes the prediction error signal $d_n$ on the basis of quantizer step-size $\Delta_n$ to find a code $L_n$. Specifically, the encoder 30 finds the code $L_n$ on the basis of the following expression (2):

$$L_n = [d_n / \Delta_n] \tag{2}$$

Here [ ] is Gauss' notation. Specifically, [x] indicates the largest of integers which do not exceed a real number x.

This code $L_n$ is sent to a quantizer 40. The quantizer 40 quantizes the prediction error signal $d_n$ using the code $L_n$ to find a quantized value $q_n$ on the basis of the quantizer step-size $\Delta_n$. Specifically, the quantizer 40 finds the quantized value $q_n$ on the basis of the following expression (3):

$$q_n = (L_n + 0.5)\Delta_n \tag{3}$$

This quantized value $q_n$ is sent to an adder 50. The adder 50 finds, on the basis of a predicted signal $y_n$ corresponding to a value obtained by sampling the audio signal this time $x_n$ and the quantized value $q_n$, a predicted signal $y_{n+1}$ corresponding to a value obtained by sampling the audio signal the next time $x_{n+1}$. Specifically, the adder 50 finds the predicted signal $y_{n+1}$ corresponding to the value obtained by sampling the audio signal the next time $x_{n+1}$ on the basis of the following expression (4):

$$y_{n+1} = y_n + q_n \tag{4}$$

In this case, an initial value $y_0$ of the predicted signal is 0.

The quantizer step-size $\Delta_n$ is updated by a quantizer step-size determining circuit 60. The quantizer step-size determining circuit 60 comprises a multiplier 113, a judging circuit 111, and a coefficient memory 112. A function $M(L_n)$ corresponding to the code $L_n$ is stored in the coefficient memory 112. In the present embodiment, the code $L_n$ is expressed by four bits. Specifically, the most significant bit (MSB) of the code $L_n$ indicates whether the code $L_n$ is positive or negative. The MSB is "1" when the code $L_n$ is negative. Consequently, the code $L_n$ is an integer from −8 to +7.

This quantizer step-size $\Delta_n$ is inputted to the multiplier 113. The output $L_n$ of the encoder 30 is inputted to the judging circuit 111. The judging circuit 111 reads out the function $M(L_n)$ corresponding to the inputted code $L_n$ from the coefficient memory 112 and sends the same to the multiplier 113. The multiplier 113 multiplies the inputted quantizer step-size $\Delta_n$ by the function $M(L_n)$, to find quantizer step-size $\Delta_{n+1}$ corresponding to the value obtained by sampling the audio signal the next time $X_{n+1}$. Specifically, the multiplier 113 finds the quantizer step-size $\Delta_{n+1}$ corresponding to the value obtained by sampling the audio signal the next time $X_{n+1}$ on the basis of the following expression (5):

$$\Delta_{n+1} = \Delta_n \times M(L_n) \tag{5}$$

The relationship between the code $L_n$ and the function $M(L_n)$ and the relationship between the code $L_n$ and the quantizer step-size $\Delta_{n+1}$ are shown in Table 1.

TABLE 1

| $L_n$ | | $M(L_n)$ | $\Delta_{n+1}$ |
|---|---|---|---|
| 0 | −1 | 0.9 | $0.9\Delta_n$ |
| 1 | −2 | 0.9 | $0.9\Delta_n$ |
| 2 | −3 | 0.9 | $0.9\Delta_n$ |
| 3 | −4 | 0.9 | $0.9\Delta_n$ |
| 4 | −5 | 1.2 | $1.2\Delta_n$ |
| 5 | −6 | 1.6 | $1.6\Delta_n$ |
| 6 | −7 | 2.0 | $2.0\Delta_n$ |
| 7 | −8 | 2.4 | $2.4\Delta_n$ |

Meanwhile, if an attempt to improve the quality of a reproduced sound is made, processing for compressing an audio signal becomes complicated. In each of the above described coding systems such as the PASC system, the ATRAC system and the ATC system, an analysis is conducted in a frequency region. Accordingly, processing becomes complicated, so that the hardware and software scales of the coding device become larger, to increase the cost thereof. Further, also in the ADPCM system, one division (the foregoing expression (2)) and two multiplications (the foregoing expressions (3) and (5)) are carried out in coding one sample. One of the multiplications is a multiplication by a fixed coefficient having a decimal point. Accordingly, processing becomes complicated, so that the hardware and software scales of the coding device become larger, to increase the cost thereof.

In the conventional ADPCM system, the predicted signal $y_{n+1}$ corresponding to the value obtained by sampling the audio signal the next time $X_{n+1}$ is found by adding the quantized value $q_n$ to the predicted signal $y_n$ corresponding to the value obtained by sampling the audio signal this time $x_n$ as represented by the foregoing expression (4). In a case where the predicted signal is found on the basis of the foregoing expression (4), however, even if the amount of information in excess of a predetermined amount is assigned as the number of quantization bits, quantization noise is increased.

One example of a coding and decoding device employing the ADPCM system is disclosed in Japanese Patent Publication No. 5926/1988. In this coding and decoding device, a difference (a prediction error signal) between an input audio signal and a predicted signal is found by a subtracter. The prediction error signal found by the subtracter is sent to an adaptive quantizer. In the adaptive quantizer, the prediction error signal is divided by a normalizing factor adaptively updated, to be coded. A code found by the adaptive quantizer is sent to an adaptive inverted quantizer having a decoder and a multiplier. In the adaptive inverted quantizer, the code is decoded by the decoder and then, an output of the decoder is multiplied by the normalizing factor by the multiplier. Consequently, a decoded value is obtained. The decoded value is sent to an adaptive predictor comprising an adder and a filter. In the adaptive predictor, this predicted signal is added to the decoded value by the adder and then, a predetermined operation is performed by the filter, to produce the succeeding predicted signal. A coefficient of the filter is adaptively corrected on the basis of the output of the decoder in the adaptive inverted quantizer.

The coding and decoding device described in the above described prior art document has the advantages of resisting errors in a transmission path or a recording medium, being superior in band compression characteristics and being small in scale. In this coding and decoding device, however, when the variation between samples of the input audio signal is large, a prediction error is increased and the normalizing factor (quantizer step-size) is increased, resulting in an increased quantization error.

SUMMARY OF THE INVENTION

A first object of the present invention is to provide an audio signal coding and decoding device which can be reduced in hardware scale and cost.

A second object of the present invention is to provide an audio signal coding and decoding device capable of reducing quantization noise.

A third object of the present invention is to provide an audio signal coding and decoding device capable of reducing a quantization error even when the variation between samples of an input audio signal is large.

A first audio signal coding and decoding device according to the present invention comprises an adaptive differential pulse code modulation coding device for coding an audio signal, an adaptive differential pulse code modulation decoding device for decoding the audio signal coded by the coding device, an integrator provided in the preceding stage of the coding device and for decreasing the variation between unit samples of the input audio signal of the coding device, and a differentiator provided in the succeeding stage of the decoding device and for processing the audio signal decoded by the decoding device so that the variation decreased by the integrator is restored to the original one.

In the first audio signal coding and decoding device according to the present invention, the integrator is provided in the preceding stage of the coding device. Accordingly, the variation between the unit samples of the input audio signal of the coding device is decreased. Therefore, a prediction error signal obtained by the coding device is decreased. As a result, quantizer step-size is decreased, resulting in a reduced quantization error.

The above described integrator comprises, for example, a first adder circuit having a first input terminal and a second input terminal and for adding a first input signal and a second input signal to be inputted to the input terminals, a first multiplier circuit for halving the input audio signal and sending an output as the first input signal to the first input terminal, a second multiplier circuit for halving an output of the first adder circuit, and a first delay circuit for delaying an output of the second multiplier circuit by one sampling period and sending the output as the second input signal to the second input terminal.

The above described differentiator comprises, for example, a third multiplier circuit for doubling the input audio signal, a second delay circuit for delaying the input audio signal by one sampling period, and a second adder circuit for subtracting an output of the second delay circuit from an output of the third multiplier circuit.

The above described coding device comprises a circuit for operating the difference between the audio signal and a predicted signal to obtain a prediction error signal, a circuit for assigning a code to the prediction error signal on the basis of first quantizer step-size, a predicted value determining circuit for updating the predicted signal on the basis of the quantized value, which is obtained from the code assigned to the prediction error signal, and a first quantizer step-size determining circuit for updating the first quantizer step-size on the basis of the code assigned to the prediction error signal. In addition, the above described decoding device comprises a circuit for decoding a code obtained by the coding device on the basis of second quantizer step-size and a second quantizer step-size determining circuit for updating the second quantizer step-size on the basis of the code obtained by the coding device.

Examples of the above described quantizer step-size determining circuit include one for comprising a shift register into which the first quantizer step-size determined this time is loaded and shifting means for shifting the contents of the shift register by a predetermined amount in a predetermined direction in accordance with the code obtained this time to obtain the succeeding first quantizer step-size. As the above described first quantizer step-size determining circuit, one comprising a shift register into which the first quantizer step-size determined this time is loaded and an adder circuit and for performing a bit shift operation and an addition operation of the first quantizer step-size determined this time in accordance with the code obtained this time to obtain the succeeding first quantizer step-size may be used.

Examples of the above described second quantizer step-size determining circuit include one comprising a shift register into which the second quantizer step-size determined this time is loaded and shifting means for shifting the contents of the shift register by a predetermined amount in a predetermined direction in accordance with the code obtained this time to obtain the succeeding second quantizer step-size. As the above described quantizer step-size determining circuit, one comprising a shift register into which the second quantizer step-size determined this time is loaded and an adder circuit and for performing a bit shift operation and an addition operation of the second quantizer step-size determined this time in accordance with the code obtained this time to obtain the succeeding second quantizer step-size may be used.

As the above described predicted value determining circuit, one finding a predicted signal $y_n$ corresponding to a value obtained by sampling the audio signal this time using a decoded signal $W_{n-1}$ corresponding to a value obtained by sampling the audio signal the last time and a decoded signal $W_{n-2}$ corresponding to a value obtained by sampling the audio signal the time before last on the basis of the following expression:

$$y_n = 2W_{n-1} - W_{n-2}$$

A second audio signal coding and decoding device according to the present invention comprises an adaptive differential pulse code modulation coding device for coding an audio signal and an adaptive differential pulse code modulation decoding device for decoding the audio signal coded by the coding device. The above described coding device comprises a circuit for operating the difference between the audio signal and a predicted signal to obtain a prediction error signal, a circuit for assigning a code to the prediction error signal on the basis of first quantizer step-size, a predicted value determining circuit for updating the predicted signal on the basis of the quantized value, which is obtained from the code assigned to the prediction error signal, and a first quantizer step-size determining circuit for updating the first quantizer step-size on the basis of the code assigned to the prediction error signal. The above described decoding device comprises a circuit for decoding a code obtained by the coding device on the basis of second quantizer step-size and a second quantizer step-size determining circuit for updating the second quantizer step-size on the basis of the code obtained by the coding device. At least one of the above described first quantizer step-size determining circuit and the above described second quantizer step-size determining circuit is constituted by a shift register into which the quantizer step-size determined this time is loaded and shifting means for shifting the contents of the shift register by a predetermined amount in a predetermined direction in accordance with the code obtained this time to obtain the succeeding quantizer step-size.

As the above described predicted value determining circuit, one finding a predicted signal $y_n$ corresponding to a value obtained by sampling the audio signal this time using a decoded signal $W_{n-1}$ corresponding to a value obtained by sampling the audio signal the last time and a decoded signal $W_{n-2}$ corresponding to a value obtained by sampling the audio signal the time before last on the basis of the following expression may be used:

$$y_n = 2W_{n-1} - W_{n-2}$$

A third audio signal coding and decoding device according to the present invention comprises an adaptive differential pulse code modulation coding device for coding an audio signal and an adaptive differential pulse code modulation decoding device for decoding the audio signal coded by the coding device. The above described coding device comprises a circuit for operating the difference between the audio signal and a predicted signal to obtain a prediction error signal, a circuit for assigning a code to the prediction error signal on the basis of first quantizer step-size, a predicted value determining circuit for updating the predicted signal on the basis of the quantized value, which is obtained from the code assigned to the prediction error signal, and a first quantizer step-size determining circuit for updating the first quantizer step-size on the basis of the code assigned to the prediction error signal. The above described decoding device comprises a circuit for decoding a code obtained by the coding device on the basis of second quantizer step-size and a second quantizer step-size determining circuit for updating the second quantizer step-size on the basis of the code obtained by the coding device. At least one of the above described first quantizer step-size determining circuit and the above described second quantizer step-size determining circuit is one comprising a shift register into which the quantizer step-size determined this time is loaded and an adder circuit and for performing a bit shift operation and an addition operation of the quantizer step-size determined this time in accordance with the code obtained this time to obtain the succeeding quantizer step-size.

As the above described predicted value determining circuit, one finding a predicted signal $y_n$ corresponding to a value obtained by sampling the audio signal this time using a decoded signal $W_{n-1}$ corresponding to a value obtained by sampling the audio signal the last time and a decoded signal $W_{n-2}$ corresponding to a value obtained by sampling the audio signal the time before last on the basis of the following expression may be used:

$$y_n = 2W_{n-1} - W_{n-2}$$

In the second and third audio signal coding and decoding devices according to the present invention, the hardware scales of the coding device and the decoding device can be reduced, thereby to make it possible to make a CD player compact and low in cost.

A fourth audio signal coding and decoding device according to the present invention comprises an adaptive differential pulse code modulation coding device for coding an audio signal and an adaptive differential pulse code modulation decoding device for decoding the audio signal coded by the coding device. The above described coding device comprises a circuit for operating the difference between the audio signal and a predicted signal to obtain a prediction error signal, a circuit for assigning a code to the prediction error signal on the basis of first quantizer step-size, a predicted value determining circuit for updating the predicted signal on the basis of the quantized value, which is obtained from the code assigned to the prediction error signal, and a first quantizer step-size determining circuit for updating the first quantizer step-size on the basis of the code assigned to the prediction error signal. The above described decoding device comprises a circuit for decoding a code obtained by the coding device on the basis of second quantizer step-size and a second quantizer step-size determining circuit for updating the second quantizer step-size on the basis of the code obtained by the coding device. The above described predicted value determining circuit finds a predicted signal $y_n$ corresponding to a value obtained by sampling the audio signal this time using a decoded signal $W_{n-1}$ corresponding a value obtained by sampling the audio signal the last time and a decoded signal $W_{n-2}$ corresponding to a value obtained by sampling the audio signal the time before last on the basis of the following expression:

$$y_n = 2W_{n-1} - W_{n-2}$$

In the fourth audio signal coding and decoding device according to the present invention, quantization noise can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
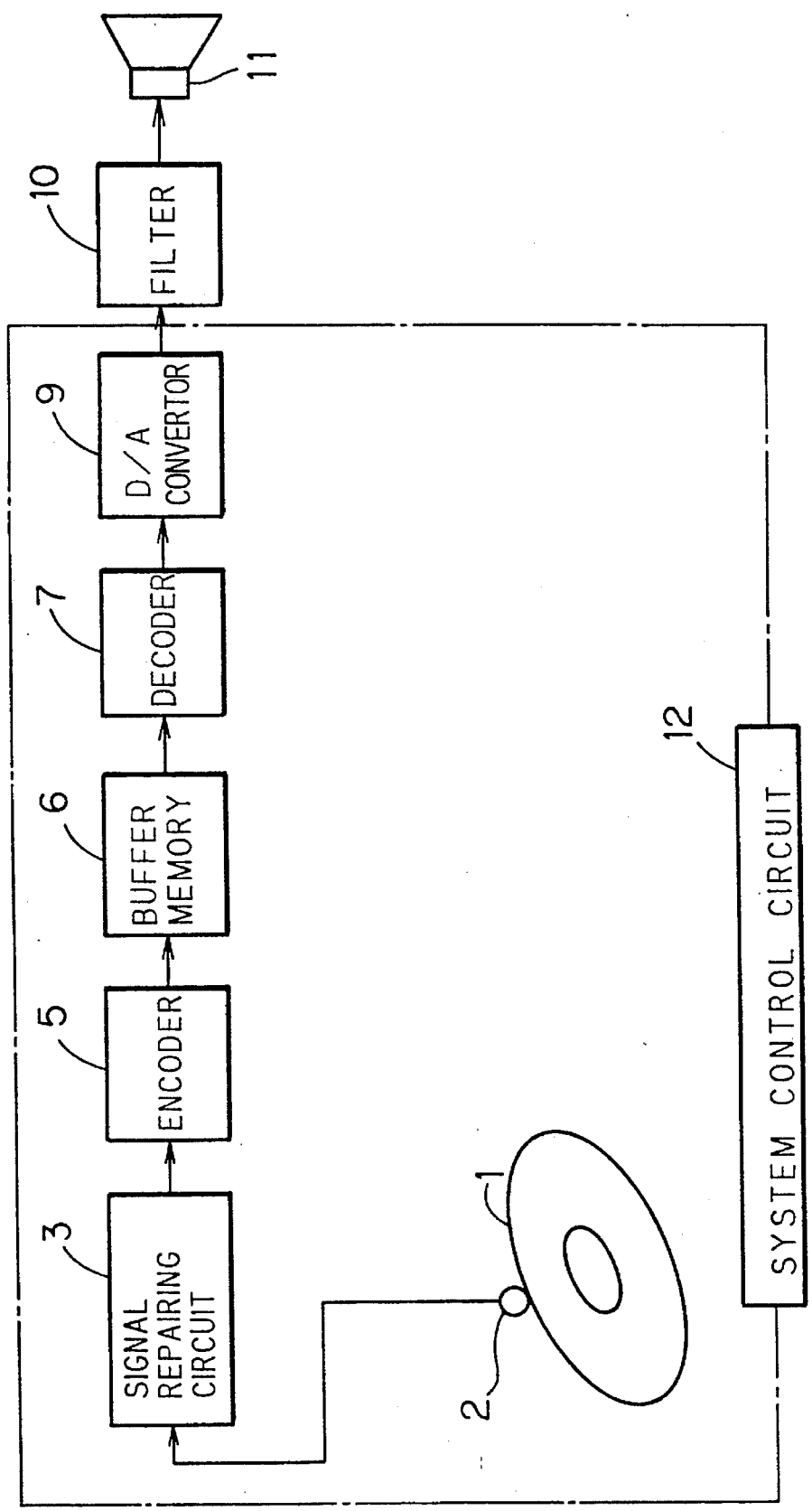
FIG. 2 is a block diagram showing the electrical construction of a CD player.

FIG. 2 shows the electrical construction of a CD player.

A digital audio signal and a sub code which are recorded on a compact disk (CD) 1 are read out at a speed which is twice the specified speed (at a sampling frequency of 88.2 kHz/ch) by an optical pickup 2. The sub code includes information such as an address, a track number and an index.

The signal read by the optical pickup 2 is sent to a signal repairing circuit 3. The signal repairing circuit 3 passes only the audio signal read by the optical pickup 2 without any modification at a speed which is twice the specified speed when a sound is not cut off in the audio signal. When a sound is cut off in the audio signal read by the optical pickup 2, the reading by the optical pickup 2 is interrupted, to repair the cutting of the sound by the signal repairing circuit 3.

The audio signal outputted from the signal repairing circuit 3 is sent to an ADPCM coding device 5. The coding device 5 codes the 16-bit audio signal inputted at a speed which is twice the specified speed, to obtain a 4-bit code. The audio signal coded by the coding device 5 is temporarily stored in a buffer memory 6 at a speed which is twice the specified speed. The buffer memory 6 is constituted by a RAM having a capacity of 1 megabyte.

The signal stored in the buffer memory 6 is sent to an ADPCM decoding device 7 from the buffer memory 6 at the specified speed (44.1 kHz/ch). The decoding device 7 decodes the signal inputted. A digital signal outputted from the decoding device 7 is sent to a digital-to-analog converter 9. In the digital-to-analog convertor 9, the digital signal is converted into an analog signal. The analog signal outputted from the digital-to-analog converter 9 is sent to a low-pass filter 10. The low-pass filter 10 cuts a predetermined frequency component from the input signal. A cutoff frequency of the low-pass filter 10 is, for example, 20 kHz. A signal passed through the low-pass filter 10 is sent to a speaker 11. A reproduced sound is outputted from the speaker 11.

Respective constituent elements in the range enclosed by a dash line, that is, the optical pickup 2, the signal repairing circuit 3, the coding device 5, the buffer memory 6, the decoding device 7, and the digital-to-analog converter 9 are controlled by a system control circuit 12.

When the buffer memory 6 enters a full state, an operation of reading out a signal from the optical pickup 2 is stopped by the system control circuit 12. In this case, the control circuit 12 identifies a signal to be read out the next time by the sub code finally accepted in the signal repairing circuit 3 and resumes the reading of the signal the moment a storageable area in the buffer memory 6 is obtained. Therefore, the continuity of the signal sent to the decoding device 7 is held.

Even if a sound is cut off in the audio signal read by the optical pickup 2, continuous reproduction is possible if a code remains in the buffer memory 6. In this example, a code corresponding to a stereo audio signal of a maximum of 2.875 seconds can be temporarily stored in the buffer memory 6, thereby to make it possible to detect the cutting of a sound, detect a portion where the sound is cut off, search the head of a connected portion, and repair the cutting of the sound by the control circuit 12 and the signal repairing circuit 3 within a time allowance of 2.875 seconds.

Figure 3:
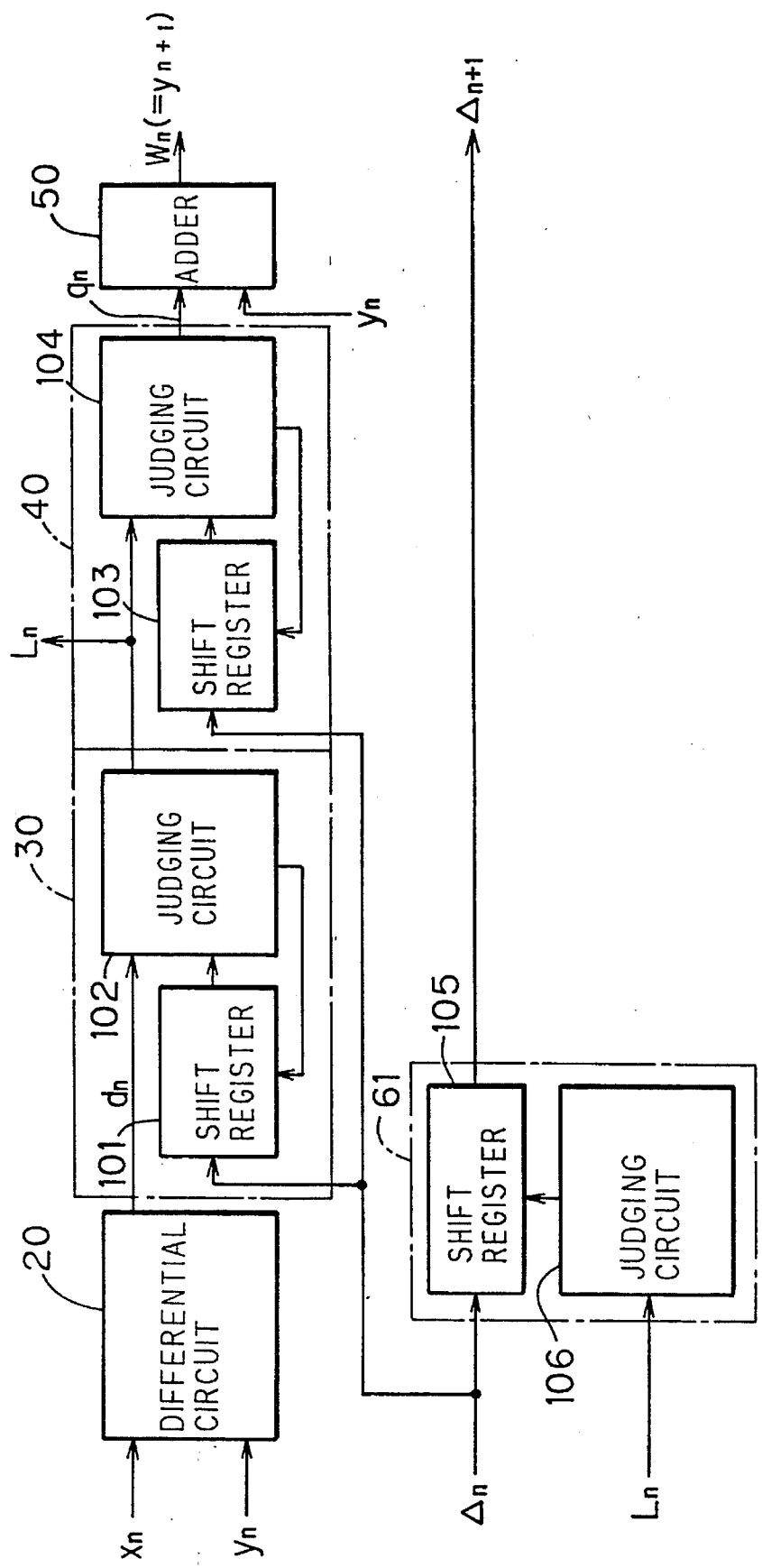
FIG. 3 is a block diagram showing the electrical construction of a coding device.

FIG. 3 shows the detailed construction of the coding device 5.

A differential circuit 20 finds a difference $d_n$ (a prediction error signal) between a 16-bit PCM digital audio signal $x_n$ inputted from the signal repairing circuit 3 and a predicted signal $y_n$. Specifically, the differential circuit 20 finds the prediction error signal $d_n$ on the basis of the following expression (6):

$$d_n = x_n - y_n \tag{6}$$

The prediction error signal $d_n$ is sent to an encoder 30. The encoder 30 comprises a shift register 101 into which quantizer step-size $\Delta_n$ is loaded and a judging circuit 102 for controlling the shift direction and the shift amount of the shift register 101 as well as coding the prediction error signal $d_n$ on the basis of the output $d_n$ of the differential circuit 20 and an output of the shift register 101. Specifically, the encoder 30 finds a code $L_n$ on the basis of the following expression (7):

$$L_n = [d_n / \Delta_n] \tag{7}$$

Here [ ] is Gauss' notation. Specifically, [x] indicates the largest of integers which do not exceed a real number x. In this example, the code $L_n$ is expressed by four bits. Specifically, the most significant bit of the code $L_n$ indicates whether the code $L_n$ is positive or negative. The MSB is "1" when the code $L_n$ is negative. Consequently, the code $L_n$ is an integer from −8 to +7. When the value of $d_n/\Delta_n$ is not more than −8, the code $L_n$ is taken as −8. When the value of $d_n/\Delta_n$ is not less than +7, the code $L_n$ is taken as +7. An initial value $\Delta_0$ of the quantizer step-size may be an arbitrary value other than 0 and is set to, for example, 8.

An operation of the encoder 30 is as follows. In the following description, signs used have the following meanings:

$\Delta_n >> n$ means a value $(\Delta_n/2^n)$ obtained by shifting the quantizer step-size $\Delta_n$ in the shift register right n bits.

$\Delta_n << n$ means a value $(2^n \times \Delta_n)$ obtained by shifting the quantizer step-size $\Delta_n$ in the shift register left n bits.

a=b means substituting b in a.

(A) In the case of $d_n \geq 0$ (Step S1)

When $\{d_n-(\Delta_n<<2)\} \geq 0$, that is, $(d_n-4\Delta_n) \geq 0$, the program proceeds to the step S2 after the substitution of $L_n=4$ and $d_n=\{d_n-(\Delta_n<<2)\}$.

When $\{d_n-(\Delta_n<<2)\}<0$, that is, $\{d_n-4\Delta_n\}<0$, the program proceeds to the step S2 after the substitution of $L_n=0$.

(Step S2)

When $\{d_n-(\Delta_n<<1)\} \geq 0$, that is, $\{d_n-2\Delta_n\} \geq 0$, the program proceeds to the step S3 after the substitution of $L_n=L_n+2$ and $d_n=\{d_n-(\Delta_n<<1)\}$.

When $\{d_n-(\Delta_n<<1)\}<0$, that is, $\{d_n-2\Delta_n\}<0$, the program proceeds to the step S3.

(Step S3)

When $\{d_n-\Delta_n\} \geq 0$, the program is terminated after the substitution of $L_n=L_n+1$.

When $\{d_n-\Delta_n\}<0$, the program is terminated without any modification.

(B) In the case of $d_n<0$ (Step S1)

When $\{d_n+(\Delta_n<<2)\} \leq 0$, that is, $\{d_n+4\Delta_n\} \leq 0$, the program proceeds to the step S2 after the substitution of $L_n=-5$ and $d_n=\{d_n+(\Delta_n<<2)\}$.

When $\{d_n+(\Delta_n<<2)\}>0$, that is, $\{d_n+4\Delta_n\}>0$, the program proceeds to the step S2 after the substitution of $L_n=-1$.

(Step S2)

When $\{d_n+(\Delta_n<<1)\} \leq 0$, that is $\{d_n+2\Delta_n\} \leq 0$, the program proceeds to the step S3 after the substitution of $L_n=L_n-2$ and $d_n=\{d_n+(\Delta_n<<1)\}$.

When $\{d_n+(\Delta_n<<1)\}>0$, that is, $\{d_n+2\Delta_n\}>0$, the program proceeds to the step S3.

(Step S3)

When $\{d_n-\Delta_n\} \leq 0$, the program is terminated after the substitution of $L_n=L_n-1$.

When $\{d_n-\Delta_n\}>0$, the program is terminated without any modification.

The code $L_n$ obtained by the encoder 30 is sent to a quantizer 40. The quantizer 40 comprises a shift register 103 into which the quantizer step-size $\Delta_n$ is loaded and a judging circuit 104 for controlling the shift direction and the shift amount of the shift register 103 as well as quantizing the prediction error signal $d_n$ on the basis of the output $L_n$ of the encoder 30 and an output of the shift register 103 to find a quantized value $q_n$. Specifically, the quantizer 40 finds the quantized value $q_n$ on the basis of the following expression (8):

$$q_n=(L_n+0.5)\Delta_n \qquad (8)$$

An operation of the quantizer 40 is as follows:

(A) In the case of $L_n \geq 0$ (Step S1)

When the least significant bit of $L_n$ is "1", the program proceeds to the step S2 after the substitution of $q_n=(\Delta_n>>1)+\Delta_n=0.5\Delta_n+\Delta_n$.

When the least significant bit of $L_n$ is "0", the program proceeds to the step S2 after the substitution of $q_n=(\Delta_n>>1)=0.5\Delta_n$.

(Step S2)

When the second least significant bit of $L_n$ is "1", the program proceeds to the step S3 after the substitution of $q_n=q_n+(\Delta_n<<1)=q_n+2\Delta_n$.

When the second least significant bit of $L_n$ is "0", the program proceeds to the step S3.

(Step S3)

When the third least significant bit of $L_n$ is "1", the program is terminated after the substitution of $q_n=q_n+(\Delta_n<<2)=q_n+4\Delta_n$.

When the third least significant bit of $L_n$ is "0", the program is terminated without any modification.

(B) In the case of $L_n<0$ (Step S1)

The program proceeds to the step S2 after the substitution of $L_n=-L_n-1$.

(Step S2)

When the least significant bit of $L_n$ is "1", the program proceeds to the step S3 after the substitution of $q_n=(\Delta_n>>1)-\Delta_n=0.5\Delta_n-\Delta_n$.

When the least significant bit of $L_n$ is "0", the program proceeds to the step S3 after the substitution of $q_n=(\Delta_n>>1)=0.5\Delta_n$.

(Step S3)

When the second least significant bit of $L_n$ is "1", the program proceeds to the step S4 after the substitution of $q_n=q_n-(\Delta_n<<1)=q_n-2\Delta_n$.

When the second least significant bit of $L_n$ is "0", the program proceeds to the step S4.

(Step S4)

When the third least significant bit of $L_n$ is "1", the program proceeds to the step S5 after the substitution of $q_n=q_n-(\Delta_n<<2)=q_n-4\Delta_n$.

When the third least significant bit of $L_n$ is "0", the program proceeds to the step S5.

(Step S5)

The program is terminated after the substitution of $q_n=q_n-\Delta_n$.

The quantized value $q_n$ obtained by the quantizer 40 is sent to an adder 50. The adder 50 finds, on the basis of a predicted signal $y_n$ corresponding to a value obtained by sampling the audio signal this time $x_n$ and the quantized value $q_n$, a predicted signal $y_{n+1}$ corresponding to a value obtained by sampling the audio signal the next time $x_{n+1}$. Specifically, the adder 50 finds the predicted signal $y_{n+1}$ corresponding to the value obtained by sampling the audio signal the next time $x_{n+1}$ on the basis of the following expression (9):

$$y_{n+1}=y_n+q_n \qquad (9)$$

In this case, an initial value $y_0$ of the predicted signal is 0.

The quantizer step-size $\Delta_n$ is updated by a quantizer step-size determining circuit 61. The quantizer step-size determining circuit 61 comprises s shift register 105 to which the quantizer step-size $\Delta_n$ is inputted and a judging circuit 106 to which the code $L_n$ is inputted. The judging circuit 106 shifts the data $\Delta_n$ in the shift register 105 by a predetermined number of bits in a predetermined direction in accordance with the code $L_n$ inputted, to find the succeeding quantizer step-size $\Delta_{n+1}$.

Table 2 shows the shift direction and the shift amount corresponding to the code $L_n$ and quantizer step-size $\Delta_{n+1}$ obtained as the result of the shift.

TABLE 2

| $L_n$ | | CONTENTS OF SHIFT | $\Delta_{n+1}$ |
|---|---|---|---|
| 0 | −1 | RIGHT SHIFT OF 1 BIT | $0.5\Delta_n$ |
| 1 | −2 | NO SHIFT | $\Delta_n$ |
| 2 | −3 | NO SHIFT | $\Delta_n$ |
| 3 | −4 | NO SHIFT | $\Delta_n$ |
| 4 | −5 | NO SHIFT | $\Delta_n$ |
| 5 | −6 | LEFT SHIFT OF 1 BIT | $2\Delta_n$ |
| 6 | −7 | LEFT SHIFT OF 1 BIT | $2\Delta_n$ |
| 7 | −8 | LEFT SHIFT OF 2 BITS | $4\Delta_n$ |

In the present embodiment, the quantizer step-size $\Delta_n$ is updated by a shift operation. Accordingly, the amount of processing can be made smaller, as compared with that in a method of multiplying quantizer step-size $\Delta_n$ by a coefficient $M(L_n)$ by the multiplier 113 as in the quantizer step-size determining circuit 60 in the conventional coding device shown in FIG. 1. Consequently, it is possible to reduce the hardware scale of the coding device and to reduce the cost thereof.

In the decoding device 7, a reproduced signal $x_n'$ is found from the code $L_n$ obtained by the coding device 5 on the basis of the following expressions (10) and (11):

$$q_n' = (L_n + 0.5)\Delta_n \quad (10)$$

$$x_n' = y_n' + q_n' \quad (11)$$

Also in the decoding device 7, quantizer step-size $\Delta_n$ is updated by a quantizer step-size determining circuit having the same structure as the quantizer step-size determining circuit 61 in the coding device 5 shown in FIG. 3. Specifically, the quantizer step-size determining circuit in the decoding device 7 determines quantizer step-size by the shift operation as shown in Table 2.

Figure 1:
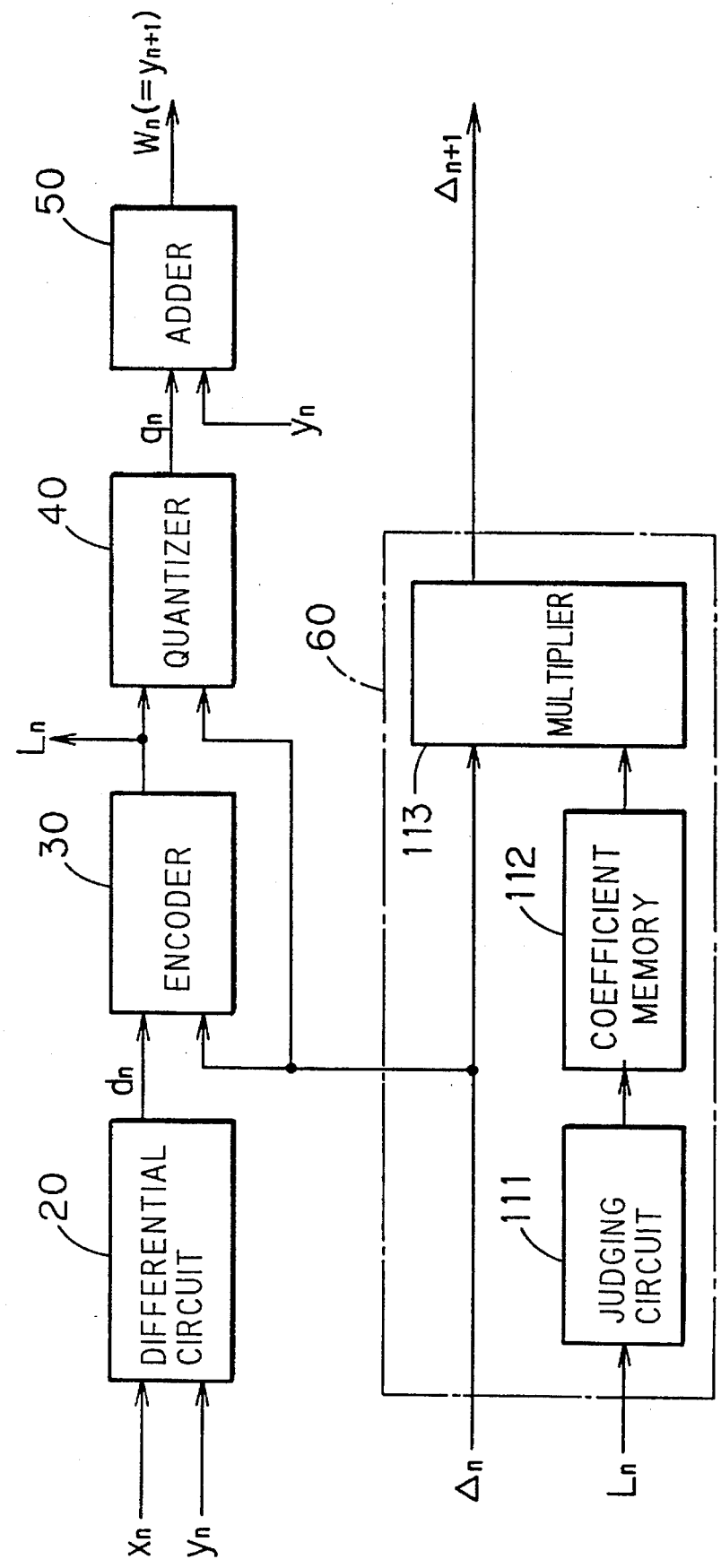
FIG. 1 is a block diagram showing the electrical construction of a conventional coding device.

Comparison between the hardware scale of the coding device 5 according to the above described embodiment and the hardware scale of the conventional coding device shown in FIG. 1 using the reduced number of gates is as shown in Table 3.

TABLE 3

| Embodiment | Conventional Example |
|---|---|
| reduced number of gates in 16-step shift register = about 70 | 16 bits X reduced number of gates in 16-bit multiplier = about 1800 |

TABLE 3-continued

| Embodiment | Conventional Example |
|---|---|
| | reduced number of gates in 16-bit coefficient memory = about 520 |
| total number of gates = about 70 | total number of gates = about 2320 |

As apparent from Table 3, in the present embodiment, the hardware can be saved by approximately 2250 gates, and the coding device 5 and the decoding device 7 can be respectively realized by a gate array of 4000 gates. Specifically, the above described embodiment, the hardware of the coding device 5 and the decoding device 7 can be reduced in scale, thereby to make it possible to make the CD player compact and low in cost.

Figure 4:
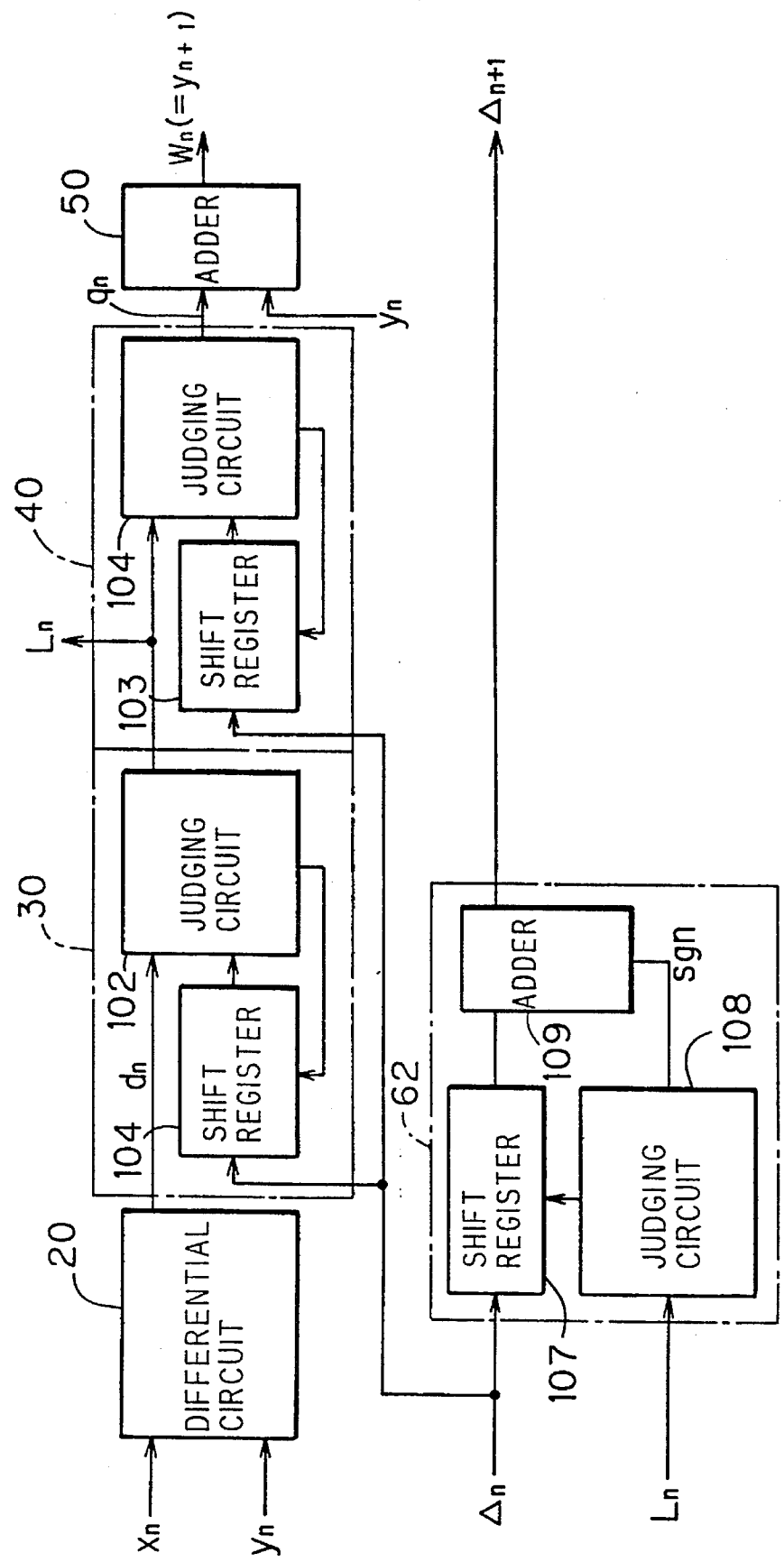
FIG. 4 is a block diagram showing the electrical construction of another coding device.

FIG. 4 shows another example of the coding device 5. In FIG. 4, the same reference numerals are assigned to the same portions as those shown in FIG. 3 and hence, the description thereof is omitted.

In the coding device shown in FIG. 4, a quantizer step-size determining circuit 62 differs from that in the coding device shown in FIG. 3. The quantizer step-size determining circuit 62 comprises a shift register 107 to which quantizer step-size $\Delta_n$ is inputted, a judging circuit 108 to which a code $L_n$ is inputted, and an adder 109. The judging circuit 108 controls the shift direction and the shift amount of the shift register 107 in accordance with the code $L_n$ inputted. In addition, the judging circuit 108 sends a sign flag sgn representing addition or subtraction to the adder 109 in accordance with the code $L_n$ inputted. The adder 109 performs a predetermined operation on the basis of an output of the shift register 107 and the sign flag sgn, to find the succeeding quantizer step-size $\Delta_{n+1}$.

Table 4 shows the contents of the operation of the adder 109 corresponding to the code $L_n$ and the quantizer step-size $\Delta_{n+1}$ obtained as the result of the operation.

TABLE 4

| $L_n$ | | CONTENTS OF OPERATION | $\Delta_{n+1}$ |
|---|---|---|---|
| 0 | −1 | [ NO SHIFT ] − [ RIGHT SHIFT OF 3 BITS ] = $\Delta_n − \Delta_n/8$ | $(7/8) \times \Delta_n$ |
| 1 | −2 | [ NO SHIFT ] − [ RIGHT SHIFT OF 3 BITS ] = $\Delta_n − \Delta_n/8$ | $(7/8) \times \Delta_n$ |
| 2 | −3 | [ NO SHIFT ] − [ RIGHT SHIFT OF 3 BITS ] = $\Delta_n − \Delta_n/8$ | $(7/8) \times \Delta_n$ |
| 3 | −4 | [ NO SHIFT ] − [ RIGHT SHIFT OF 3 BITS ] = $\Delta_n − \Delta_n/8$ | $(7/8) \times \Delta_n$ |
| 4 | −5 | [ NO SHIFT ] + [ RIGHT SHIFT OF 2 BITS ] = $\Delta_n + \Delta_n/4$ | $(5/4) \times \Delta_n$ |
| 5 | −6 | [ NO SHIFT ] + [ RIGHT SHIFT OF 1 BITS ] = $\Delta_n + \Delta_n/2$ | $(3/2) \times \Delta_n$ |
| 6 | −7 | [ LEFT SHIFT OF 1 BIT ] = $2\Delta_n$ | $2\Delta_n$ |
| 7 | −8 | [ LEFT SHIFT OF 1 BIT ] + [ RIGHT SHIFT OF 1 BIT ] = $2\Delta_n + \Delta_n/2$ | $(5/2) \times \Delta_n$ |

Although in the above described embodiment, the hardware scale is slightly increased, as compared with that of the coding device shown in FIG. 3, the hardware scale is significantly reduced, as compared with that of the conventional coding device shown in FIG. 1.

Comparison between the hardware scale of the coding device according to the above described embodiment and the hardware scale of the conventional coding device shown in FIG. 1 using the reduced number of gates is as shown in Table 5.

TABLE 5

| Embodiment | Conventional Example |
|---|---|
| reduced number of gates in | 16 bits X reduced number of |

TABLE 5-continued

| Embodiment | Conventional Example |
| --- | --- |
| 16-step shift register = about 70 | gates in 16-bit multiplier = about 1800 |
| reduced number of gates in 16-bit adder = about 200 | reduced number of gates in 16-bit coefficient memory = about 520 |
| total number of gates = about 270 | total number of gates = about 2320 |

As apparent from Table 5, in the present embodiment, the hardware can be saved by approximately 2050 gates. Specifically, according to the above described embodiment, the hardware of the coding device 5 and the decoding device 7 can be reduced in scale, thereby to make it possible to make a CD player compact and low in cost.

In a decoding device corresponding to the coding device shown in FIG. 4, quantizer step-size $\Delta_n$ is updated by a quantizer step-size determining circuit having the same structure as the quantizer step-size determining circuit 62 in the coding device shown in FIG. 4. Specifically, the quantizer step-size determining circuit in the decoding device determines quantizer step-size by a shift operation and an addition operation as shown in Table 4.

Figure 5:
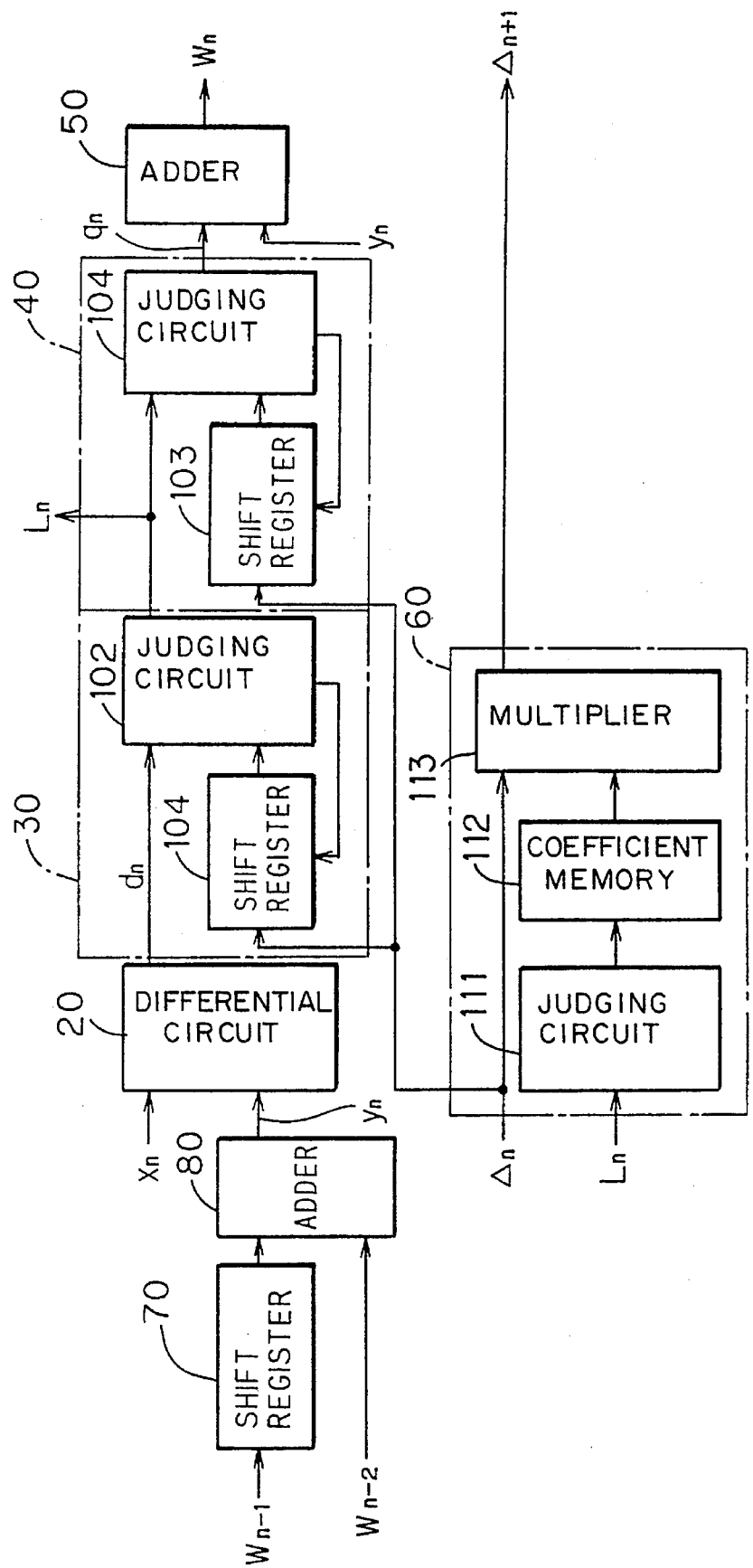
FIG. 5 is a block diagram showing the electrical construction of still another coding device.

FIG. 5 shows another coding device. In FIG. 5, the same reference numerals are assigned to the same portions as those shown in FIG. 3 and hence, the description thereof is omitted.

In the coding device shown in FIG. 5, a method of producing a predicted signal $y_n$ differs from that shown in FIG. 3, and a shift register 70 and an adder 80 are added.

Used as a quantizer step-size determining circuit 60 is the same one as that in the conventional coding device shown in FIG. 1. Specifically, the quantizer step-size determining circuit 60 multiplies quantizer step-size $\Delta_n$ by a coefficient M ($L_n$) shown in Table 1, to find the succeeding quantizer step-size $\Delta_{n+1}$.

The adder 50 finds a decoded signal $W_n$ on the basis of an output $q_n$ of a quantizer 40, a decoded signal $W_{n-1}$ obtained the last time, and a decoded signal $W_{n-2}$ obtained the time before last by the following expression (12):

$$W_n = 2W_{n-1} - W_{n-2} + q_n \quad (12)$$

The decoded signal $W_{n-1}$ found the last time by the adder 50 is inputted to the shift register 70. The decoded signal $W_{n-2}$ found the time before last by the adder 50 and the contents $2W_{n-1}$ after shifting the contents of the shift register 70 left one bit are inputted to the adder 80. The adder 80 adds the input signals $2W_{n-1}$ and $W_{n-2}$. Specifically, the adder 80 performs an operation represented by the following expression (13), to find a predicted signal $y_n$.
s $$y_n = 2W_{n-1} - W_{n-2} \quad (13)$$

In this case, initial values of $W_{n-1}$ and $W_{n-2}$ are 0.

When the above described coding device is used, a reproduced signal $x_n'$ is found in the following manner. Specifically, the reproduced signal $x_n'$ is found on the basis of a code $L_n$ found by the coding device by the following expressions (14) and (15):

$$q_n' = (L+0.5)\Delta_n \quad (14)$$

$$x_n' = W_n' = 2W_{n-1}' - W_{n-2}' + q_n' \quad (15)$$

Quantizer step-size $\Delta_n$ is updated by multiplying $\Delta_n$ by a coefficient M ($L_n$) shown in Table 1, as in the quantizer step-size determining circuit 60 in the coding device.

In the present embodiment, the predicted signal is found using the foregoing expression (13). Accordingly, an improvement in a signal to noise ratio is predicted with respect to a low frequency signal. On experiments, a 5 to 6 decibel improvement in the signal to noise ratio is obtained with respect to an audio signal having low level such as an audio signal in classical music.

In the above described embodiment shown in FIG. 5, the quantizer step-size determining circuit 60 may be replaced with the quantizer step-size determining circuit 61 shown in FIG. 3 or the quantizer step-size determining circuit 62 shown in FIG. 4.

Figure 6:
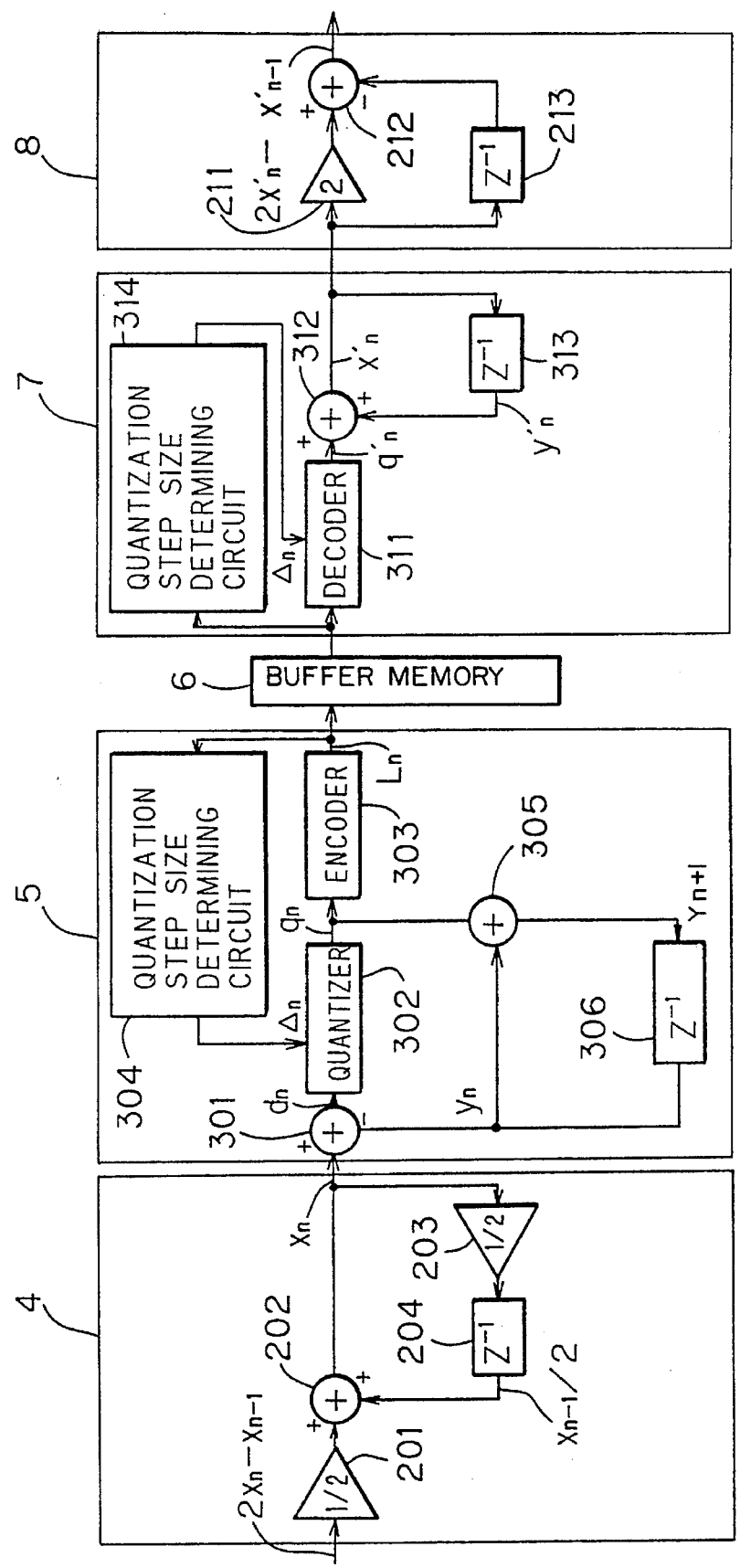
FIG. 6 is a block diagram showing the electrical construction of another CD player.

FIG. 6 shows another example of a CD player. In FIG. 6, the optical pickup 2, the signal repairing circuit 3, the digital-to-analog converter 9, the filter 10, the speaker 11, and the system control circuit 12 shown in FIG. 2 are omitted.

In this CD player, an integrator 4 for making it difficult to pass high frequency components of a digital audio signal is provided in the preceding stage of a coding device 5 so as to decrease the variation between unit samples of the input audio signal. In addition, a differentiator 8 for passing a lot of high frequency components which are hardly passed by the integrator 4 and returning frequency characteristics to the original frequency characteristics is provided in the succeeding stage of a decoding device 7.

In the integrator 4, the input audio signal sent from the signal repairing circuit 3 is halved by a first multiplier 201. An output of the first multiplier 201 is sent to an adder 202. An output of the adder 202 is halved by a second multiplier 203 and then, is delayed by one sampling period by a delay circuit 204 and is fed back to the adder 202. Consequently, the adder 202 adds the output of the first multiplier 201 and an output of the delay circuit 204. Let $x_n$ be the output of the integrator 4, that is, the output of the adder 202. In this case, the output of the delay circuit 204 is $x_{n-1}/2$. In addition, an input of the integrator 4 is $2x_n - x_{n-1}$, and the output of the first multiplier 201 is $x_n - (x_{n-1}/2)$.

Shift registers are used as the first multiplier 201 and the second multiplier 203. An input signal of each of the multipliers 201 and 203 is shifted right one bit in a shift register, thereby to obtain a signal which is half of the input signal.

Furthermore, the input signals of the multipliers 201 and 203 are respectively halved by the first multiplier 201 and the second multiplier 203. Accordingly, the output of the integrator 4 does not overflow. For example, when the maximum value of a 16-bit signal is inputted to the integrator 4, the output of the first multiplier 201 which is one signal inputted to the adder 202 becomes a 15-bit signal. In addition, the other signal inputted to the adder 202 becomes a signal shifted right one bit by the second multiplier 203. Consequently, the output of the adder 202, that is, the output of the integrator 4 does not exceed 16 bits.

In the differentiator 8, an output $x_n'$ from the decoding device 7 is doubled by a third multiplier 211. An output $2x_n'$ of the third multiplier 211 is sent to an adder 212. The output $x_n'$ from the decoding device 7 is delayed by one sampling period by a delay circuit 213 and is sent to the adder 212. The adder 202 subtracts an output $x_{n-1}'$ of the delay circuit 213 from the output $2x_n'$ of the third multiplier 211. Consequently, an output of the adder 212, that is, an output of the differentiator 8 becomes $2x_n' - x_{n-1}'$.

The output signal $x_n$ of the integrator 4 is sent to the coding device 5. In the coding device 5, the input signal $x_n$ is sent to an adder 301. A predicted signal $y_n$ is also inputted to the adder 301. The adder 301 finds a difference (a prediction error signal) $d_n$ between the output signal $x_n$ of the integrator 4 and the predicted signal $y_n$ by the following expression (16):

$$d_n = x_n - y_n \qquad (16)$$

The prediction error signal $d_n$ is sent to a quantizer 302. The quantizer 302 finds a code $L_n$ on the basis of quantizer step-size $\Delta_n$ determined by a quantizer step-size determining circuit 304 by the following expression (17) and finds a quantized value $q_n$ by the following expression (18):

$$L_n = [d_n / \Delta_n] \qquad (17)$$

$$q_n = (L_n + 0.5)\Delta_n \qquad (18)$$

An output of the quantizer 302 is sent to an encoder 303. The encoder 303 takes out the code $L_n$ from the output of the quantizer 302.

The output $L_n$ of the encoder 303 is fed back to the quantizer step-size determining circuit 304. The quantizer step-size determining circuit 304 finds the succeeding quantizer step-size $\Delta_{n+1}$ on the basis of the following expression (19):

$$\Delta_{n+1} = \Delta_n X\ M(L_n) \qquad (19)$$

A function $M(L_n)$ is the same as that shown in the foregoing table 1.

The output $q_n$ of the quantizer 302 is also sent to an adder 305. An output of the adder 305 is delayed by one sampling period by a delay circuit 306 and then, is sent to the adder 301 as a predicted signal and is fed back to the adder 305. The adder 305 adds the output $q_n$ of the quantizer 302 and the output $y_n$ of the delay circuit 306, to find a predicted signal $y_{n+1}$ corresponding to a value obtained by sampling the audio signal the next time $x_{n+1}$.

A code $L_n$ for each value obtained by sampling the audio signal by the coding device 5 is sent to a buffer memory 6. When the buffer memory 6 becomes full, the code $L_n$ is sent to the decoding device 7 from the buffer memory 6.

In the decoding device 7, the code $L_n$ from the buffer memory 6 is sent to a quantizer step-size determining circuit 314 and a decoder 311. The quantizer step-size determining circuit 314 determines quantizer step-size $\Delta_n$ on the basis of the foregoing expression (19). The decoder 311 finds a quantized value $q_n'$ using the code $L_n$ and the quantizer step-size $\Delta_n$ determined by the quantizer step-size determining circuit 314 by the following expression (21):

$$q_n' = (L_n + 0.5)\Delta_n \qquad (21)$$

The output $q_n'$ of the decoder 311 is sent to an adder 312. The adder 312 adds the quantized value $q_n'$ and a predicted signal $y_n'$ outputted from a delay circuit 313, to find a decoded signal $x_n'$. The delay circuit 313 delays the decoded signal $x_n'$ outputted from the adder 312 by one sampling period, to obtain the succeeding predicted signal $y_{n+1}'$. The predicted signal $y_{n+1}'$ and the decoded signal $x_n'$ are represented by the following expression (22):

$$y_{n+1}' = x_n' = y_n' + q_n' \qquad (22)$$

In the CD player as shown in FIG. 6, the audio signal outputted from the signal repairing circuit 3 is sent to the integrator 4 before it is coded. Consequently, the variation between unit samples of the input signal $x_n$ of the coding device 5 becomes small. Consequently, the prediction error signal $d_n$ obtained by the adder 301 in the coding device 5 is decreased. As a result, the quantizer step-size $\Delta_n$ determined by the quantizer step-size determining circuit 304 becomes small, resulting in a reduced quantization error.

Comparison is made between a case where an audio signal is coded and decoded by the conventional device shown in FIG. 1 which is not provided with the integrator 4 and the differentiator 8 shown in FIG. 6 and a case where an audio signal is coded and decoded by the device shown in FIG. 6 shows that an approximately 5 to 6 decibel improvement is obtained in a signal to noise ratio, and a quantization error is aurally reduced.

The coding device and the decoding device shown in FIG. 6 may be replaced with the coding device and the decoding device described using FIG. 3, the coding device and the decoding device described using FIG. 4, and the coding device and the decoding device described using FIG. 5.

Furthermore, the coding device and the decoding device shown in FIG. 6 may be replaced with ones using the quantizer step-size determining circuit 61 shown in FIG. 3 in place of the quantizer step-size determining circuits in the coding device and the decoding device described using FIG. 5, and ones using the quantizer step-size determining circuit 62 shown in FIG. 4 in place of the quantizer step-size determining circuits in the coding device and the decoding device described using FIG. 5.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An audio signal coding and decoding device comprising:

an adaptive differential pulse code modulation coding device for coding an audio signal;

an adaptive differential pulse code modulation decoding device for decoding the audio signal coded by said coding device;

an integrator provided in a preceding stage of said coding device for decreasing variation between unit samples of the audio signal of said coding device; and a differentiator provided in a succeeding stage of said decoding device for processing the audio signal decoded by said decoding device so that the variation decreased by said integrator is restored to an original value.

2. The audio signal coding and decoding device according to claim 1, wherein said integrator comprises a first adder circuit having a first input terminal and a second input terminal for adding a first input signal applied to said first input terminal and a second input signal applied to said second input terminal, and said first adder circuit having an output, a first multiplier circuit for halving the input audio signal and sending an output as the first input signal to said first input terminal, a second multiplier circuit for halving an output of said first adder circuit, and a first delay circuit for delaying an output of said second multiplier by one sampling period and sending the output as the second input signal to said second input terminal;

said integrator having as its output said output of said first adder circuit.

3. The audio signal coding and decoding device according to claim 2, wherein said differentiator comprises a third multiplier circuit for doubling the decoded audio signal, a second delay circuit for delaying the decoded audio signal by one sampling period, and a second adder circuit for adding an inverted output of said second delay circuit to an output of said third multiplier circuit.

4. The audio signal coding and decoding device according to claim 1, wherein said coding device comprises a first circuit for operating the difference between the audio signal and a predicted signal to obtain a prediction error signal, a second circuit for assigning a code to said prediction error signal on the basis of first quantizer step-size, a predicted value determining circuit for updating the predicted signal on the basis of the code assigned to said prediction error signal, and a first quantizer step-size determining circuit for updating the first quantizer step-size on the basis of the code assigned to said prediction error signal, said decoding device comprises a third circuit for decoding a code obtained by said second circuit on the basis of second quantizer step-size, and a second quantizer step-size determining circuit for updating the second quantizer step-size on the basis of the code obtained by said second circuit, said first quantizer step-size determining circuit comprising a first shift register into which the first quantizer step-size currently determined is loaded, and first shifting means for shifting the contents of said first shift register by a predetermined amount in a predetermined direction in accordance with the code currently obtained to obtain the succeeding first quantizer step-size, said second quantizer step-size determining circuit comprising a second shift register into which the second quantizer step-size currently determined is loaded, and second shifting means for shifting the contents of said second shift register by a predetermined amount in a predetermined direction in accordance with the code currently obtained to obtain the succeeding second quantizer step-size.

5. The audio signal coding and decoding device according to claim 1, wherein said coding device comprises a first circuit for operating the difference between the audio signal and a predicted signal to obtain a prediction error signal, a second circuit for assigning a code to said prediction error signal on the basis of first quantizer step-size, a predicted value determining circuit for updating the predicted signal on the basis of the code assigned to said prediction error signal, and a first quantizer step-size determining circuit for updating the first quantizer step-size on the basis of the code assigned to said prediction error signal, and said decoding device comprises a third circuit for decoding a code obtained by said second circuit on the basis of second quantizer step-size, and a second quantizer step-size determining circuit for updating the second quantizer step-size on the basis of the code obtained by said second circuit, said first quantizer step-size determining circuit comprising a first shift register into which the first quantizer step-size currently determined is loaded, and a fourth circuit for performing a bit shift operation and an addition operation of the first quantizer step-size currently determined in accordance with the code currently obtained to obtain the succeeding first quantizer step-size, said second quantizer step-size determining circuit comprising a second shift register into which the second quantizer step-size currently determined is loaded, and a fifth circuit for performing a bit shift operation and an addition operation of the second quantizer step-size currently determined in accordance with the code currently obtained to obtain the succeeding second quantizer step-size.

6. The audio signal coding and decoding device according to claim 1, wherein said coding device comprises a circuit for operating the difference between the audio signal and a predicted signal to obtain a prediction error signal, a circuit for assigning a code to said prediction error signal on the basis of first quantizer step-size, a predicted value determining circuit for updating the predicted signal on the basis of the code assigned to said prediction error signal, and a first quantizer step-size determining circuit for updating the first quantizer step-size on the basis of the code assigned to said prediction error signal, said predicted value determining circuit finding a predicted signal $y_n$ corresponding to a value of the currently sampled audio signal using a decoded signal $W_{n-1}$ corresponding to a value of the previously sampled audio signal and a decoded signal $W_{n-2}$ corresponding to a value of the sampled audio signal before said previous audio signal on the basis of the following expression:

$$y_n = 2W_{n-1} - W_{n-2}.$$

7. The audio signal coding and decoding device according to claim 4, wherein said predicted value determining circuit finding a predicted signal $y_n$ corresponding to a value of the currently sampled audio signal using a decoded signal $W_{n-1}$ corresponding to a value of the previously sampled audio signal and a decoded signal $W_{n-2}$ corresponding to a value of the sampled audio signal before said previous audio signal on the basis of the following expression:

$$y_n = 2W_{n-1} - W_{n-2}.$$

8. The audio signal coding and decoding device according to claim 5, wherein said predicted value determining circuit finding a predicted signal $y_n$ corresponding to a value of the currently obtained sampled audio signal using a decoded signal $W_{n-1}$ corresponding to a value of the previously sampled audio signal and a decoded signal $W_{n-2}$ corresponding to a value of the sampled audio signal before said previous audio signal on the basis of the following expression:

$$y_n = 2W_{n-1} - W_{n-2}.$$

9. The audio signal coding and decoding device according to claim 1, wherein said coding device comprises a first circuit for operating the difference between the audio signal and a predicted signal to obtain a prediction error signal, a second circuit for assigning a code to said prediction error signal on the basis of first quantizer step-size, a predicted value determining circuit for updating the predicted signal on the basis of the code assigned to said prediction error signal, and a first quantizer step-size determining circuit for updating the first quantizer step-size on the basis of the code assigned to said prediction error signal, said decoding device comprises a third circuit for decoding a code obtained by said second circuit on the basis of second quantizer step-size, and a second quantizer step-size determining circuit for updating the second quantizer step-size on the basis of the code obtained by said second circuit, said first quantizer step-size determining circuit comprising a shift register into which the first quantizer step-size currently determined is loaded, and shifting means for shifting the contents of said shift register by a predetermined amount in a predetermined direction in accordance with the code currently obtained to obtain the succeeding first quantizer step-size.

10. The audio signal coding and decoding device according to claim 1, wherein said coding device comprises a first circuit for operating the differences between the audio signal and a predicted signal to obtain a prediction error signal, a second circuit for assigning a code to said prediction error signal on the basis of first quantizer step-size, a predicted value determining circuit for updating the predicted signal on the basis of the code assigned to said prediction error signal, and a first quantizer step-size determining circuit for updating the first quantizer step-size on the basis of the code assigned to said prediction error signal, said decoding device comprises a third circuit for decoding a code obtained by said second circuit on the basis of second quantizer step-size, and a second quantizer step-size determining circuit for updating the second quantizer step-size on the basis of the code obtained by said second circuit, said second quantizer step-size determining circuit comprising a shift register into which the second quantizer step-size currently determined is loaded, and shifting means for shifting the contents of said shift register by a predetermined amount in a predetermined direction in accordance with the code currently obtained to obtain the succeeding second quantizer step-size.

11. The audio signal coding and decoding device according to claim 1, wherein said coding device comprises a first circuit for operating the difference between the audio signal and a predicted signal to obtain a prediction error signal, a second circuit for assigning a code to said prediction error signal on the basis of first quantizer step-size, a predicted value determining circuit for updating the predicted signal on the basis of the code assigned to said prediction error signal, and a first quantizer step-size determining circuit for updating the first quantizer step-size on the basis of the code assigned to said prediction error signal, and said decoding device comprises a third circuit for decoding a code obtained by said second circuit on the basis of second quantizer step-size, and a second quantizer step-size determining circuit for updating the second quantizer step-size on the basis of the code obtained by said second circuit, said first quantizer step-size determining circuit comprising a shift register into which the first quantizer step-size currently determined is loaded, and a fourth circuit for performing a bit shift operation and an addition operation of the first quantizer step-size currently determined in accordance with the code currently obtained to obtain the succeeding first quantizer step-size.

12. The audio signal coding and decoding device according to claim 1, wherein said coding device comprises a first circuit for operating the difference between the audio signal and a predicted signal to obtain a prediction error signal, a second circuit for assigning a code to said prediction error signal on the basis of first quantizer step-size, a predicted value determining circuit for updating the predicted signal on the basis of the code assigned to said prediction error signal, and a first quantizer step-size determining circuit for updating the first quantizer step-size on the basis of the code assigned to said prediction error signal, and said decoding device comprises a third circuit for decoding a code obtained by said second circuit on the basis of second quantizer step-size, and a second quantizer step-size determining circuit for updating the second quantizer step-size on the basis of the code obtained by said second circuit, said second quantizer step-size determining circuit comprising a shift register into which the second quantizer step-size currently determined is loaded, and a fourth circuit for performing a bit shift operation and an addition operation of the second quantizer step-size currently determined in accordance with the code currently obtained to obtain the succeeding second quantizer step-size.

13. An audio signal coding and decoding device comprising:

an adaptive differential pulse code modulation coding device for coding an audio signal; and an adaptive differential pulse code modulation decoding device for decoding the audio signal coded by said coding device, said coding device comprising a first circuit for operating the difference between the audio signal and a predicted signal to obtain a prediction error signal, a second circuit for assigning a code to said prediction error signal on the basis of first quantizer step-size, a predicted value determining circuit for updating the predicted signal on the basis of the code assigned to said prediction error signal, and a first quantizer step-size determining circuit for updating the first quantizer step-size on the basis of the code assigned to said prediction error signal, said decoding device comprising a third circuit for decoding a code obtained by said second circuit on the basis of second quantizer step-size, and a second quantizer step-size determining circuit for updating the second quantizer step-size on the basis of the code obtained by said second circuit, said first quantizer step-size determining circuit comprising a first shift register into which the first quantizer step-size currently determined is loaded, and first shifting means for shifting the contents of said first shift register by a predetermined amount in a predetermined direction in accordance with the code currently obtained to obtain the succeeding first quantizer step-size, said second quantizer step-size determining circuit comprising a second shift register into which the second quantizer step-size currently determined is loaded, and second shifting means for shifting the contents of said second shift register by a predetermined amount in a predetermined direction in accordance with the code currently obtained to obtain the succeeding second quantizer step-size.

14. The audio signal coding and decoding device according to claim 13, wherein said predicted value determining circuit finds a predicted signal $y_n$ corresponding to a value of the currently sampled audio signal using a decoded signal $W_{n-1}$ corresponding to a value of the previously sampled audio signal and a decoded signal $W_{n-2}$ corresponding to a value of the sampled audio signal before said previous audio signal on the basis of the following expression:

$$y_n = 2W_{n-1} - W_{n-2}.$$

15. An audio signal coding and decoding device comprising an adaptive differential pulse code modulation coding device for coding an audio signal; and an adaptive differential pulse code modulation decoding device for decoding the audio signal coded by said coding device, said coding device comprising a first circuit for operating the difference between the audio signal and a predicted signal to obtain a prediction error signal, a second circuit for assigning a code to said prediction error signal on the basis of first quantizer step-size, a predicted value determining circuit for updating the predicted signal on the basis of the code assigned to said prediction error signal, and a first quantizer step-size determining circuit for updating the first quantizer step-size on the basis of the code assigned to said prediction error signal, said decoding device comprising a third circuit for decoding a code obtained by said second circuit on the basis of second quantizer step-size, and a second quantizer step-size determining circuit for updating the second quantizer step-size on the basis of the code obtained by said second circuit, said first quantizer step-size determining circuit comprising a first shift register into which the first quantizer step-size currently determined is loaded, and a fourth circuit for performing a bit shift operation and an addition operation of the first quantizer step-size currently determined in accordance with the code currently obtained to obtain the succeeding first quantizer step-size, said second quantizer step-size determining circuit comprising a second shift register into which the second quantizer step-size currently determined is loaded, and a fifth circuit for performing a bit shift operation and an addition operation of the second quantizer step-size currently determined in accordance with the code currently obtained to obtain the succeeding second quantizer step-size.

16. The audio signal coding and decoding device according to claim 15, wherein said predicted value determining circuit finds a predicted signal $y_n$ corresponding to a value of the currently sampled audio signal using a decoded signal $W_{n-1}$ corresponding to a value of the previously sampled audio signal and a decoded signal $W_{n-2}$ corresponding to a value of the sampled audio signal before said previous audio signal on the basis of the following expression:

$$y_n = 2W_{n-1} - W_{n-2}.$$

17. An audio signal coding and decoding device comprising an adaptive differential pulse code modulation coding device for coding an audio signal; and an adaptive differential pulse code modulation decoding device for decoding the audio signal coded by said coding device, said coding device comprising a first circuit for operating the difference between the audio signal and a predicted signal to obtain a prediction error signal, a second circuit for assigning a code to said prediction error signal on the basis of first quantizer step-size, a predicted value determining circuit for updating the predicted signal on the basis of the code assigned to said prediction error signal, and a first quantizer step-size determining circuit for updating the first quantizer step-size on the basis of the code assigned to said prediction error signal, said decoding device comprising a third circuit for decoding a code obtained by said second circuit on the basis of second quantizer step-size, and a second quantizer step-size determining circuit for updating the second quantizer step-size on the basis of the code obtained by said second circuit, said predicted value determining circuit finding a predicted signal $y_n$ corresponding to a value of the currently sampled audio signal using a decoded signal $W_{n-1}$ corresponding to a value of the previously sampled audio signal and a decoded signal $W_{n-2}$ corresponding to a value of the sampled audio signal before said previous audio signal on the basis of the following expression:

$$y_n = 2W_{n-1} - W_{n-2}.$$

* * * * *